UNITED STATES PATENT OFFICE.

RICHARD S. RHODES AND EBENEZER WHYTE, OF CHICAGO, ILLINOIS.

IMPROVED PROCESS FOR PRESERVING EGGS.

Specification forming part of Letters Patent No. 51,480, dated December 12, 1865.

*To all whom it may concern:*

Be it known that we, RICHARD S. RHODES and EBENEZER WHYTE, of the city of Chicago, in the county of Cook and State of Illinois, have invented and discovered a new and useful Improved Process for Preservnig Eggs; and we do hereby declare that the following is a full, clear, and accurate description of the same sufficient to enable those familiar with the art to practice and use it.

The nature of our said invention consists in a certain novel mode of treating eggs, hereinafter to be fully described, whereby eggs may be preserved from decay and kept in their fresh and natural state with their vitality or life unimpaired for years.

To enable those skilled in the art to practice and make use of our invention, we will proceed to describe the same with particularity.

The eggs to be treated must of course be fresh, merchantable eggs, which are first chilled with cold air from ice or in an ice-house at a temperature of from 35° to 40° above zero. We then take sound oats, bran, or any other suitable material and dry them thoroughly in the sun or by artificial heat, and then chill said oats or other material to an even temperature with the eggs—that is, about 35° or 40° above zero. The eggs are then carefully and securely packed in the oats or other packing, all being arranged upon one end, in tight barrels, casks, or other suitable packages, which are stored in an ice-house or other suitable room, in which, by the application of ice or otherwise, the eggs are kept at a uniform and unvarying temperature of about 35° or 40°, as aforesaid. Once in from five to seven days the casks, barrels, or other packages containing the eggs must be turned over, so as to bring the upper ends of the eggs as arranged at first downward, and by successive turnings, care being taken not to displace the eggs in so doing. The eggs are turned alternately upon one end and the other during the whole time for which the process is applied, which may be for one or more years, as may be desired.

By this process eggs may be kept in their fresh and natural state for a long time without losing their vitality, so that by incubation chickens may be hatched therefrom.

Having described our process for preserving and keeping eggs, we will now specify what we claim and desire to secure by Letters Patent:

The herein-described process for preserving eggs from decay and preserving their vitality, substantially as specified and set forth.

RICHARD S. RHODES.
    EBENEZER WHYTE.

Witnesses:
 W. E. MARRS,
 C. W. HUNT.